Figure 2:
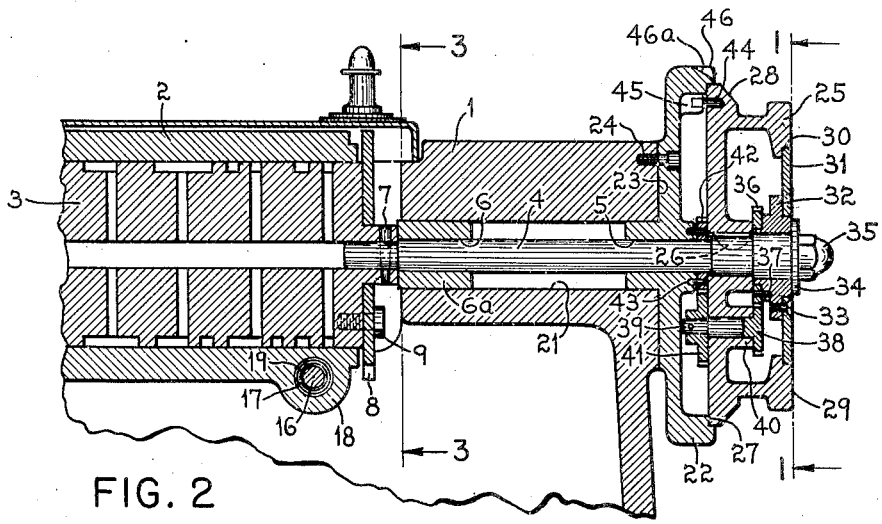
Figure 3:
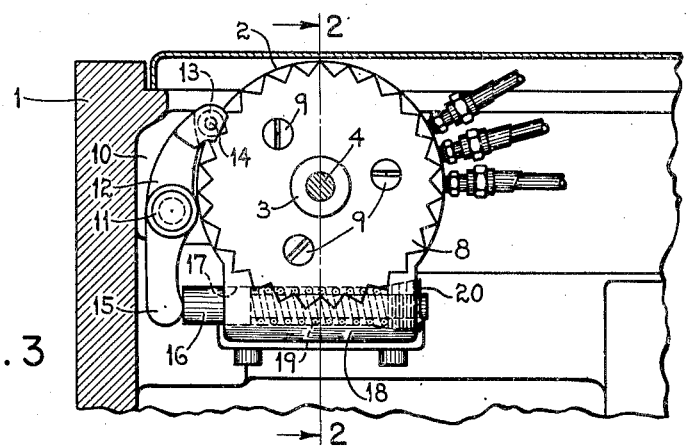
Figure 1:
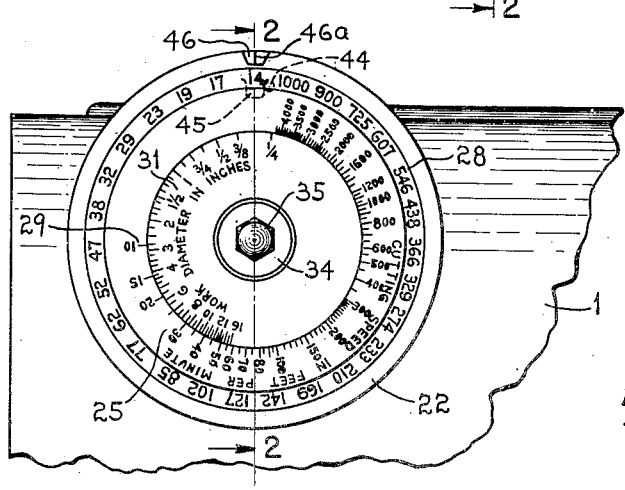

Dec. 27, 1949 R. K. LE BLOND ET AL 2,492,229
INDICATING DIAL
Original Filed June 20, 1945

INVENTORS.
RICHARD K. LeBLOND
AND HARRY C. KEMPER
BY
Toulmin & Toulmin
ATTORNEYS.

Patented Dec. 27, 1949

2,492,229

UNITED STATES PATENT OFFICE 2,492,229

INDICATING DIAL

Richard K. Le Blond, Cincinnati, and Harry C. Kemper, Goshen Township, Clermont County, Ohio, assignors to The R. K. Le Blond Machine Tool Co., Cincinnati, Ohio, a corporation of Delaware Original application June 20, 1945, Serial No. 600,584. Divided and this application July 10, 1946, Serial No. 682,504

3 Claims. (Cl. 235—84)

This invention relates to speed controlling mechanism and has for an object to provide means by which the correct setting of the mechanism for any desired operation or character of work piece may be directly and immediately ascertained.

This application is a divisional application of Serial Number 600,584, filed June 20, 1945, for Hydraulic gear shifting mechanism.

In the operation of machine tools such as a lathe, for example, it is frequently desirable and necessary to adjust the work spindle rotation speed by reference to the cutting speed at which the material should be machined and its diameter rather than referring to the actual spindle speeds in revolutions per minute. Heretofore, devices have been provided in the form of manually adjustable transfer dials by which the operator might convert the information concerning cutting speed in feet per minute and the diameter of the work to the spindle speed and then, having obtained this information, setting the spindle speed control lever or device to the speed thus indicated.

It is applicants' primary object, however, to eliminate completely the intermediate step of the transfer dial to provide an apparatus by which the operator may directly and instantaneously set the change speed transmission for correct spindle speed without taking into consideration or knowing or in any way referring to the actual spindle speed obtained but utilizing only the information of cutting speed in feet per minute and the diameter of the work.

Another object of applicants' invention is to provide a spindle rate control mechanism with a direct reading dial for selecting the correct spindle speed by directly referring to cutting speed in feet per minute and work diameter alone.

Another object of this invention is to provide a direct reading spindle setting dial indicating cutting speed in feet per minute, work diameters, and spindle speeds, all coordinated in a predetermined timed fixed relationship to completely eliminate effort and possible error by the operator in adjusting the machine.

Still another object of this invention is to provide a speed control indicating mechanism which is operable to simultaneously select speed changes in a change speed mechanism while at the same instant directly indicating spindle speed, cutting speed in feet per minute, and work diameter at all times in positive correct relationship.

Still another object of this invention is to provide a speed selecting indicating dial which completely eliminates the use of an intermediate presettable transfer dial to convert cutting speed in feet per minute and work diameters to spindle speeds enabling the operator to directly set the correct spindle speed from a knowledge of the nature of the work material and its diameter.

It is also applicants' object to provide a dial indicating mechanism of the direct reading type for any machine tool by which the character of the work and the diameter of the cutter or work, whichever is rotated, are the sole determining factors in adjusting the speed of the work or tool spindle.

Further features and advantages of this invention will appear from a detailed description of the drawings in which:

Figure I is a front elevational view of applicants' novel dial indicating mechanism, indicated by the line I—I in Figure II.

Figure II is a vertical transverse section through the dial and associated apparatus on the line II—II of Figures I and III.

Figure III is a fragmentary section on the line III—III of Figure II.

For illustrative purposes, this invention is shown applied to a lathe headstock 1 having a speed changing mechanism, which in this particular case includes a hydraulic selector valve 2, having a rotor 3 journaled in the selector valve having a housing 2. The selector valve housing 2 is appropriately mounted on the headstock 1 and is rigidly held in place thereon so as to align the rotor 3 with the actuating shaft 4 journaled in suitable bearings 5 and 6 in the headstock housing 1 and connected to the rotor 3 by a suitable pin 7.

Associated with the selector valve rotor 3 is the positioning dent device which serves to locate the rotor in the proper aligned positions for its various rotary settings. This device comprises a notched plate 8 which is fixed on the valve rotor 3 by the screws 9 so that the plate 8 and the valve rotor 3 rotate as a unit. The number of notches formed in the periphery of this plate 8 corresponds with the number of positions to which the valve rotor 3 may be set for effecting different speed changes. In a boss 10, formed integral with the headstock housing 1, is fixed the stud 11 upon which is pivotally mounted for rocking motion the pawl 12 upon the upper end of which is provided a bifurcated slot carrying a roller 13 on a pin 14 for engaging the notches in the plate 8. Also formed integrally with the pawl 12 is a downwardly depending arm 15 which engages a plunger 16 mounted in a bore 17 formed in the boss 18 of the valve housing body 2. A spring 19 confined in the bore 17 by a threaded plug 20 urges the plunger 16 against the arm 15 and thereby maintains contact between the roller 13 and the plate 8.

The dial setting mechanism may be used for quickly and directly setting the selector valve rotor 3 in its various positions to cause the desired speed change in a transmission in the headstock 1 through conventional hydraulic selector valve and actuating mechanism. The dial mechanism is supported on the headstock housing 1 in a bore 21 in aligned relationship with the axis of the valve rotor 3 and the shaft 4. A hood-shaped bracket 22 is mounted in the bore 21 and fixed securely to the front face 23 of the headstock housing 1 by suitable screws 24. The shaft 4 is rotatably mounted in the bore 5 of the bracket 22 and projects inwardly and is journaled in the bushing 6a fixed in the bore 21.

A spindle speed selector dial 25 is fixed on the shaft 4 by a suitable key 26 and is rotatable in a counterbore 27 formed in the bracket 22 so that when the dial 25 is rotated manually, this movement is translated directly to the valve rotor 3 through the shaft 4. The angular face 28 of the dial 25 is inscribed at spaced intervals with a series of numerals ranging from 14 revolutions per minute and progressively increasing to 1000 revolutions per minute so that the readings on this dial correspond with the spindle speeds obtainable by positioning the selector valve rotor 3 in its various positions for effecting shifting of a change speed transmission in the headstock 1. It may also be noted that the front face 29 of the dial 25 has an appropriately graduated scale representing the cutting speed in feet per minute at which the work may be machined. This scale is arranged in logarithmic progression starting at 10 feet per minute and increasing gradually to 4000 feet per minute and is inscribed along the edge of the counterbore 30 formed in the dial 25.

Operatively related to the dial 25 is a second dial 31 which is fixed to a hub 32 by screws 33, the hub 32 in turn being rotatably journaled on the shaft 4 and secured thereon by the washer 34 and nut 35. Along the outer edge of the dial 31 and associated with the scale on the dial 25 is a graduated scale indicating work diameter in inches ranging from one-quarter inch up to 16 inches representing the different sizes of work adaptable for the machine. In order that the scale on the disc 31 and the scale on the dial 25 may at all times be rotated in synchronism an interconnecting gear drive is provided. This drive comprises the gear 36 which is fixed to the hub 32 by a pin 37 and which is driven by a gear 38 formed integrally with a shaft 39 rotatably mounted in the boss 40 formed integrally with the dial 25. On the other end of this shaft 39 is securely fixed by an appropriate pin the gear 41 which in turn engages the gear 42 secured by the pins 43 to the hub portion of the bracket 22. There is a possibility that if the spindle speed indicating dial 25 were rotated a number of times in one direction or the other that these scales would get out of proper timed relationship with each other. In order to avoid this difficulty, the speed indicating dial 25 is limited to one complete revolution in either direction. This is accomplished by providing a suitable pin 44 which is fixed in the dial 25 and which comes into engagement with a lug 45 formed integrally with the bracket 22 and acts as a stop for the dial 25 when being rotated in either direction. A slot 46 formed in the bracket 22 having a scribed line 46a serves as an indicator means and points out the number of revolutions of the spindle during the various shiftable positions effected in the headstock transmission.

With this unique dial arrangement the various settings for different operative conditions of the headstock may be directly and instantaneously read from the dial to adjust the desired spindle speed for any size and character of work to be machined in the lathe. Reference on the part of the operator to various charts and index plates or intermediate transposing dials is wholly eliminated with this direct reading dial arrangement associated with the selector valve.

When operating such a lathe, the operator may know the desired spindle speed required for the particular size and character of the work piece to be done. In this case, he need merely rotate the control dial for the selector valve to bring the desired spindle speed indication into position with the scribed line on the indicating notch 46 associated with the dial 25.

The operator may not know however what the proper spindle speed should be for a particular job but he may know the diameter of the work to be done and he may know the cutting speed that may be used with the particular material of which the work piece is composed. In this instance he may read directly from the dial 25 the proper setting to condition the headstock for doing this work piece since this dial indicates directly any desired cutting speed within the range of the machine and is coordinated directly and automatically with the work diameter in inches dial 31 so that the operator, knowing the cutting speed and diameter of the work, merely rotates the dial 25 to bring the cutting speed indication and the work diameter in inches indication in proper register to thereby automatically give him the correct spindle speed for the job in hand.

Thus, by the simple rotation of the dial 25 and watching the graduations 29 and 31, he may directly arrive at the correct spindle speeds. No reference need be made to any preadjustable scale and then transferring these readings to indicating reference marks to get spindle speeds and then setting the dial to spindle speed. The operator obtains the correct spindle speed at the same instant that he arrives at the desired relationship of cutting feet per minute and diameter of work as directly observed on these scales 29 and 31.

In instances where this indicating dial arrangement is used with a machine tool change speed transmission for a drill press or a milling machine, the work diameter dial 31 would, of course, show the tool diameter of the drill, reamer, tap or milling cutter mounted on the spindle. In other words, under any application the dial 31 shows the diameter of the path of relative travel of the work surface and the cutting edge of the tool.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. An indicating dial, for a machine tool transmission having a housing and a shifting device operable to affect speed changes in said transmission, an actuating shaft journaled in said housing operatively connected to said shifting device, a first dial fixed on said shaft, a series of revolution per minute indicating numerals on said first dial, an indicating line on said housing positioned in indicative relationship to said speed indicating numerals, a second dial journaled on said actuating shaft, an epicyclic gear transmission connected between said housing and said second dial including differential planetary gears journaled in said first dial, cutting speed indicating numerals on said first dial, and work diameter indicating numerals on said second dial indicatively associated with said cutting speed indicating numerals.

2. An indicating dial, for a machine tool transmission having a housing and a shifting device operable to affect speed changes in said transmission, an actuating shaft journaled in said housing operatively connected to said shifting device, a first dial fixed on said shaft, a series of revolution per minute indicating numerals on said first dial, an indicating line on said housing positioned in indicative relationship to said speed indicating numerals, a second dial journaled on said actuating shaft, a gear fixed on said housing coaxially located relative to said actuating shaft, a larger gear fixed on said second dial coaxially located relative to said actuating shaft, a shaft journaled in said first dial with its axis eccentrically located relative to the axis of said actuating shaft, a gear fixed on said shaft meshing with the gear fixed on said housing, another gear fixed on said shaft meshing with the gear fixed to said second dial, and indicatively related indicating numerals and graduations on both of said dials showing cutting speed and work diameter relationship for any revolution per minute selection made with said first dial.

3. An indicating dial, for a machine tool transmission having a housing and a shifting device operable to affect speed changes in said transmission, an actuating shaft journaled in said housing operatively connected to said shifting device, a first dial fixed on said shaft, a series of revolution per minute indicating numerals on said first dial, an indicating line on said housing positioned in indicative relationship to said speed indicating numerals, a second dial journaled on said actuating shaft, a gear fixed on said housing coaxially located relative to said actuating shaft, a larger gear fixed on said second dial coaxially located relative to said actuating shaft, a shaft journaled in said first dial with its axis eccentrically located relative to the axis of said actuating shaft, a gear fixed on said shaft meshing with the gear fixed on said housing, another gear fixed on said shaft meshing with the gear fixed to said second dial, and indicatively related indicating numerals and graduations on both of said dials showing cutting speed and work diameter relationship for any revolution per minute selection made with said first dial, and detent means interacting between said housing and said shaft to accurately position said first dial in each of its revolution per minute indicating positions.

RICHARD K. LE BLOND.
HARRY C. KEMPER.

REFERENCES CITED

The following references are of record in the file of this patent:

UNITED STATES PATENTS

| Number | Name | Date |
|---|---|---|
| 2,012,084 | Hoelscher et al. | Aug. 20, 1935 |
| 2,170,293 | Carter | Aug. 22, 1939 |
| 2,277,643 | Holmes | Mar. 24, 1942 |
| 2,293,175 | Ruhl et al. | Aug. 18, 1942 |
| 2,439,209 | Halsey | Apr. 6, 1948 |